June 23, 1925.
A. S. L. PEASLEE
AUTOMATIC CONTROLLING MEANS FOR ELECTRIC PUMPS
Filed June 23, 1922
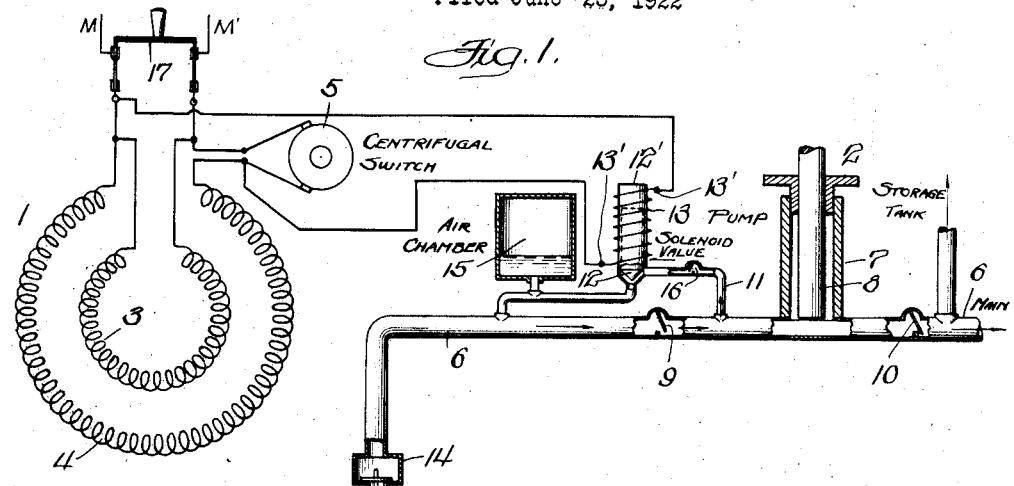
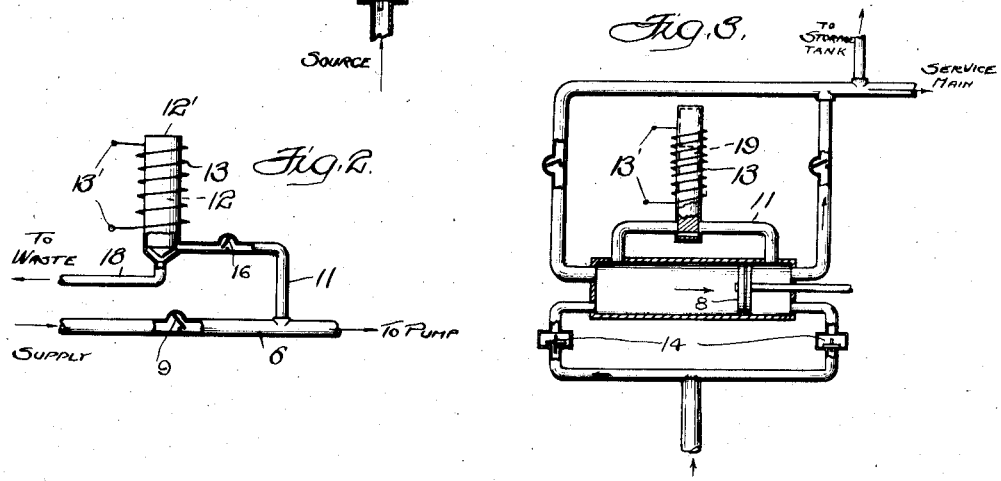
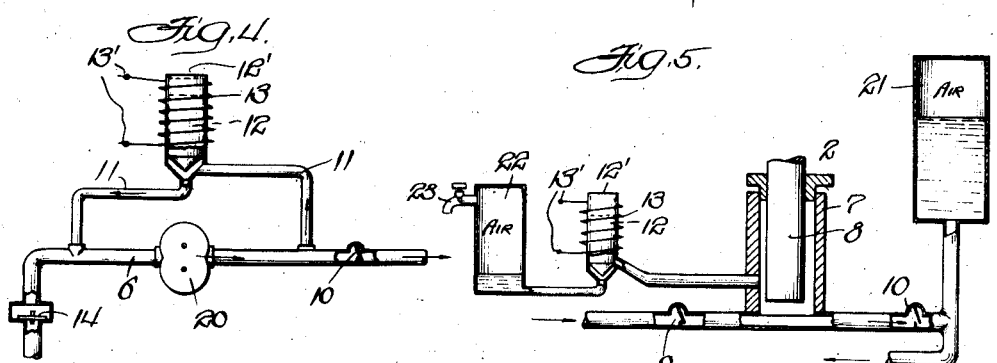
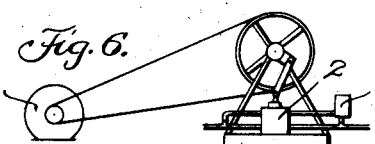
Inventor:
A. S. L. PEASLEE Patented June 23, 1925.

1,543,482

UNITED STATES PATENT OFFICE.

ALEXANDER S. L. PEASLEE, OF OAK PARK, ILLINOIS.

AUTOMATIC CONTROLLING MEANS FOR ELECTRIC PUMPS.

Application filed June 23, 1922. Serial No. 570,432.

*To all whom it may concern:*

Be it known that I, ALEXANDER S. L. PEASLEE, a citizen of the United States of America, and a resident of Oak Park, county of Cook, State of Illinois, have invented a new and useful Improvement in Automatic Controlling Means for Electric Pumps, of which the following is a specification.

This invention relates mainly to the starting of split phase alternating current motors, which are normally connected to a load, and more especially to automatic means for throwing the load temporarily off from the motor or machine connected thereto in starting.

The main purpose of this invention is to provide means for automatically relieving the pressure in the cylinder of a pump or compressor at the time of starting, in order to reduce to a minimum the torque required. Another object is to provide automatic load removing and restoring means of improved form responsive to underspeed conditions to hold the load off in starting the unit. A further object is to utilize the starting coil switch to close a load removing circuit while the motor is starting and until sufficient speed is attained to open said switch.

A particular advantage of this invention is that it permits the use of motors in which the starting torque is inherently poor, but whose characteristics when once in operation are entirely satisfactory.

This device may be used in connection with the usual centrifugal switch as ordinarily incorporated in single phase motors of the split phase type, and in single phase motors of the repulsion type; or, if necessary, a centrifugally operated electric switch may be attached to a motor or other rotating machine or part for this purpose only. This invention may well be used, for instance, with a switch device such as shown in the Kimble Patent No. 1,357,403.

The circuit through the centrifugal switch is closed when the motor is at rest and at low speeds, and when suitably connected, as will be explained, permits current to flow through a magnet or solenoid coil and so open a by-pass valve. When this valve is open, the pump will not discharge through the regular load outlet valve, but will be relieved of pressure through the by-pass thus provided.

Referring to the illustrative embodiments shown in the drawings, Fig. 1 is a conventional circuit diagram of a pump driven by a single phase motor, the apparatus being in the starting position.

Fig. 2 shows a modified form of pressure relief means.

Fig. 3 illustrates how a double acting pump may be connected, the operating position being shown.

Fig. 4 shows how a rotary pump may be connected, the starting position here being shown.

Fig. 5 shows in its starting position an embodiment adapted to admit air for air pressure systems.

Fig. 6 is a conventional representation in front elevation of a belt connected electric motor and reciprocating pump in which this invention is embodied.

In the Fig. 1 embodiment the motor 1 is direct connected to the load member 2 as understood in the art and as will be clear without further illustration. Said motor is of the split phase type and includes a main coil 3, a starting coil 4, and a centrifugal switch 5 which opens at a predetermined speed.

The member 2 is in the form of a pump connected to the pipe line 6 and comprises mainly a cylinder 7 and a piston 8. A pair of check valves 9 and 10 are set in said pipe on opposite sides of said cylinder and are virtually comprised by the pump. Extending past the intake valve 9 is a by-pass channel 11 containing an electrically controlled valve 12.

The control coil 13 for said valve 12 is adapted and arranged to open the valve, when energized. In the present instance the valve 12 is restored to its seat by gravity, though, as will be understood, a restoring spring not shown might be used.

Said coil 13 has two terminals 13' and is connected in parallel with the starting coil 4, and both are in series with the automatic switch 5.

In order to prevent the pump from running down, when idle, a supply check valve 14 may well be provided in the supply pipe as shown. In order to meet the resultant usual condition where such a supply check valve is used and where the fluid is incompressible, an air chamber 15 may be provided between valves 12 and 14 in which the discharge from the pump cylinder in starting will be received with but slight increase in pressure.

In the arrangement shown in Fig. 1, the check valve 16 is not essential, but may in some cases be advisable in order to prevent excessive wear of the solenoid operated valve, which in case of restriction at 9 would tend to make the valve 12 chatter, or at least open slightly, at each stroke of the pump when running normally.

The operation, referring to Fig. 1, is as follows: The line switch 17 is closed as shown. The main circuit is closed directly through the main coil 3, but the starting circuit, beginning at the right terminal M', extends through the centrifugal switch 5 and then divides, one branch leading through the starting coil 4 and back to terminal M, and the other branch leading through the valve control solenoid 13 and back to terminal M. The solenoid is thus energized and the valve 12 is lifted off its seat, thereby opening the by-pass 11, and so letting the pump run free. The valves 10 and 14 being closed, the water in the pump and adjacent piping merely circulates freely through the main 6 and by-pass 11, and to some extent flows alternately into and out of chamber 15. As soon as the motor comes up to speed, the switch 5 opens and so de-energizes solenoid 13, which then drops the valve 12 into its closed position. The by-pass 11 is thus closed and the load is restored to the pump and motor.

In case of overload, the motor slows down somewhat and so closes switch 5, which in turn causes the load to be removed until the motor again comes up to speed.

It should be noted that the magnetic valve 12 is enclosed loosely in a fluid tight casing 12' which may contain more or less air in its upper part and which may serve to supplement the cushioning effect of chamber 15.

Fig. 2, illustrates a simple form of this device, in which the fluid is by-passed through the valve 16 and allowed to discharge through pipe 18 into the air or waste during the interval of starting. In this case the check valve 16 is absolutely necessary in order to maintain the suction when the pump is in operation.

Fig. 3, shows the application of this device to a double acting pump or compressor. In this form, either two solenoid valves of the type illustrated in Fig. 1 may be used, as will be understood, if arranged to oppose each other, and to simultaneously open when current flows through their solenoid coils, or a single valve 19 may be used which will prevent a flow in by-pass 11 in either direction when closed.

Fig. 4 shows how a very simple arrangement of this device may be used to relieve the pressure on a rotary pump 20. In this application, the solenoid valve would form a by-pass between the discharge and suction sides when open.

Fig. 5 shows a form of this device which is particularly suitable for use with small water pumps for use in homes, for instance, where the pump 2 forces water into a tank 21 which is partly filled with air, and the compressed air then furnishes pressure when the pump is not in operation.

This form as shown is simple in form, inexpensive to manufacture and easily applied to practically all existing forms of pumps without change in the construction of same.

It includes a closed chamber 22 which is attached to the pump cylinder or any space between the discharge and inlet valves. A solenoid valve 12 of the type already described is placed between the pump cylinder 7 and said chamber 22, this valve acting as a check, being arranged to normally prevent the passage of the fluid from the cylinder to the chamber, but allowing a flow from the chamber to the pump cylinder at all times. When electric current is applied to the solenoid coil 13 a free flow of water is permitted in either direction.

A pet cock 23 is attached to the chamber in order to permit filling the latter with air. If opened when the pump is operating, the suction will draw in air and remove any fluid remaining in the chamber.

On pumping systems in which the fluid is pumped into a tank partially filled with air, it is customary to provide some means for admitting additional air to the tank, and one method is to allow a small amount of air to be drawn into the system through the suction of the pump. By partially opening the pet cock this result will be obtained.

Other modifications will suggest themselves, but will in practically all cases consist of a slight departure from the arrangements given above.

Although only certain specific embodiments of this invention have been selected to illustrate my improvements herein shown and described, it is to be understood that some of the details of the constructions shown may be altered or omitted without departing from the spirit of this invention as defined by the following claims.

I claim:

1. A pumping system comprising an electric motor, a power supply circuit therefor containing a switch to connect and disconnect said motor, a pump operatively connected to said motor, and automatic controlling means for said system, said means including a fluid tight pressure relief passageway for the pump, a valve to open and close said passageway, and means responsive to the speed of said motor to control said valve.

2. A pumping system comprising an electric motor of a type adapted for carrying a load only at, or approximately at, full speed, a power supply circuit therefor containing a switch to connect and disconnect said motor, a pump mechanically connected to said motor, and automatic controlling means for said system, said means including a fluid tight member having a pressure relief passageway for the pump to permit free running thereof at any speed less than a predetermined speed, a valve to open and close said passageway, and centrifugal speed responsive means to control said valve and to change the connections of the motor for starting and normal running.

3. A pumping system comprising a split phase alternating current motor, a single phase power supply circuit therefor containing a switch to connect and disconnect said motor, a pump operatively connected to said motor, and automatic controlling means for said system, said means including a pressure relief passageway for the pump, a valve to open and close said passageway, and speed responsive centrifugal means to open said valve and close the circuit for the auxiliary coil of the motor in starting the device and to close said valve and open said auxiliary coil circuit when the device has come up to about normal speed.

4. In a system of the character described, an alternating current motor having a starting coil and a switch responsive to speed to open the circuit of said coil when said motor comes up to speed, in combination with a pump having a pressure release member which includes a magnetizing coil connected in parallel with said starting coil and in series with said switch, whereby the load may be removed and applied automatically, according to speed.

5. A pumping system comprising an electric motor, a power supply circuit therefor containing a switch to connect and disconnect said motor, a pump operatively connected to said motor, and automatic controlling means for said system, said means including a fluid light member having a pressure relief passageway for the pump, a chamber containing elastic fluid connected to said passageway to permit displacement of fluid in the pump cylinder on each displacement stroke thereof, a valve to open and close said passageway, and means responsive to the speed of said motor to control said valve.

6. A system of the character described including in combination an electric motor, means to supply power current therefor, a pump connected to said motor, fluid tight pressure relief by-pass means for said pump, a valve arranged to open and close said by-pass means, and electromagnetic means dependent upon the speed of said motor to control said valve.

7. In a device of the character described, a pump having a pressure release by-pass, a valve to open and close said by-pass, and electromagnetic means to control said valve, which valve has a magnetic armature part, said by-pass having a fluid tight chamber within which said valve is housed and a part to which said valve is functionally related, said valve being normally immersed in the fluid to be pumped and being free to move responsive to the magnetic pull on its armature part.

8. In a device of the character described, a pump having a pressure release by-pass, a valve to open and close said by-pass, and electromagnetic means to control said valve, which valve has a magnetic armature part, said by-pass having a fluid tight chamber within which said valve is housed and a port to which said valve is functionally related, said valve being normally immersed in the fluid to be pumped and being free to move responsive to the magnetic pull on its armature part, and the valve housing part of said by-pass being of non-conductor material around which the electric energizing force is applied.

9. In a device of the character described, a pump having a pressure release by-pass, a valve to open and close said by-pass, electromagnetic means to control said valve, an electric motor adapted and arranged to control the energization of said means as the motor begins to operate and accelerates in starting to then hold said valve opened and to cause its closure when normal running speed is attained, whereby said pump may then become effective.

10. A system of the character described including in combination an electric motor, means to supply power current therefor, a pump connected to said motor, fluid tight pressure relief by-pass means for said pump, a valve arranged to open and close said by-pass means, electromagnetic means dependent upon the speed of said motor to control said valve, and a non-conducting fluid tight casing for said valve.

Signed at Chicago this 19th day of June 1922.

ALEXANDER S. L. PEASLEE.